(12) United States Patent
Lin

(10) Patent No.: US 7,793,927 B2
(45) Date of Patent: Sep. 14, 2010

(54) SHEET-FEEDING APPARATUS

(75) Inventor: Yen-Chun Lin, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 0 days.

(21) Appl. No.: 12/081,419

(22) Filed: Apr. 16, 2008

(65) Prior Publication Data
US 2009/0236790 A1    Sep. 24, 2009

(30) Foreign Application Priority Data
Mar. 21, 2008   (TW) ............... 97110130 A

(51) Int. Cl.
*B65H 5/22*    (2006.01)
*B65H 39/10*   (2006.01)

(52) U.S. Cl. ............... 271/3.14; 271/291; 271/301

(58) Field of Classification Search ............... 271/3.14, 271/291, 301; 399/364, 373, 374, 401; 347/104
See application file for complete search history.

(56) References Cited

U.S. PATENT DOCUMENTS 5,534,989 A * 7/1996 Rubscha et al. ............. 399/381
2007/0080490 A1 * 4/2007 Tu ............................ 271/3.14
2007/0081212 A1 * 4/2007 Tonami et al. ............. 359/197

FOREIGN PATENT DOCUMENTS

TW        I245014        12/2005
TW      200734181         9/2007

* cited by examiner

*Primary Examiner*—David H Bollinger
(74) *Attorney, Agent, or Firm*—Bacon & Thomas, PLLC

(57) ABSTRACT

A sheet-feeding apparatus having simple structure and capable of single-face/double-face scanning/printing sheets at high sheet-feeding efficiency. The sheet-feeding apparatus includes a sheet-feeding path in which sheets can pass through a scanning module and/or a printing module. The sheet-feeding path includes a first passage, a second passage communicating with the first passage and a subsidiary passage formed between the first and second passages. The sheets are selectively fed into and delivered through the first passage, the second passage or the subsidiary passage to be single-face/double-face scanned/printed.

12 Claims, 6 Drawing Sheets

SHEET-FEEDING APPARATUS

BACKGROUND OF THE INVENTION

The present invention is related to an improved sheet-feeding apparatus, and more particularly to a sheet-feeding apparatus having simplified sheet-feeding path for more easily single-face/double-face scanning/printing sheets at higher sheet-delivering efficiency.

There are various conventional automatic sheet-feeding apparatuses applied to office machines for scanning/printing sheets. For example, referring to FIG. 1, Taiwanese Patent No. 92118103 discloses an automatic sheet-feeding apparatus including a sheet-feeding cartridge a and a sheet-releasing cartridge a1. Papers can be placed on the sheet-feeding cartridge a. A paper p goes through a pick roller c and a roller set c1 into a first passage b1. A front face of the paper p passes through a scanning module D and then moves to a first register section e1. A guide member f1 is switched to a position as shown by phantom line to block the first passage b1 and unblock a second passage b2. The paper p goes through a roller set c2 into the second passage b2 and then goes through the roller set c1 into the first passage b1 again. A back face of the paper p then passes through the scanning module D. A guide member f2 is switched to a position as shown by phantom line to unblock the subsidiary passage b4, permitting the paper p to get into a second register section e2. Then the guide-member f3 blocks the subsidiary passage b4 and unblocks the third passage b3, whereby a roller set c3 drives the paper p into the third passage b3. Then a roller set c4 delivers the paper p to the releasing cartridge a1. At this time, the paper is double-face scanned. In a modified embodiment, the scanning module D is replaced with a printing module.

Referring to FIG. 2, Taiwanese Patent No. 95107505 discloses a single-face/double-face continuous automatic paper feeder. The paper feeder includes a paper-feeding cartridge g and a paper-releasing cartridge g1. Papers can be placed on the paper-feeding cartridge g. A paper p goes through a pick roller h into a paper-feeding passage or a first passage k1. Then the paper p goes through a roller set h1 to push away a leaf spring n1. Then a front face of the paper p passes through a scanning module D. Then the paper p goes through a roller set h2 into a paper-returning passage or a second passage k2. In case of single-face scanning, a guide member m1 is switched to a position as shown by phantom line to unblock a subsidiary passage k4, permitting the paper p to get into the subsidiary passage k4 and push away a leaf spring n2. Then a roller set h3 delivers the paper p to the paper-releasing cartridge g1.

In case of double-face scanning, the guide member m1 is positioned in a position as shown by solid line to block the subsidiary passage k4. Under such circumstance, the paper p goes through the paper-returning passage or the second passage k2 and goes through the roller set h4 to push away the leaf spring n3. Then the back face of the paper p passes through the scanning module D. Then the paper p gets into the paper-releasing passage or the third passage k3 and goes through the roller sets h5, h3 to the paper-releasing cartridge g1. At this time, the paper is double-face scanned. In a modified embodiment, the scanning module D is replaced with a printing module.

Some shortcomings exist in the above sheet-feeding apparatuses. For example, the sheet-delivering path is composed of numerous passages b1~b4 or k1~k4 so that the path is too long and complicated. Moreover, a plurality of roller sets c1~c4 or h1~h5 and guide members f1~f3 or m1 and leaf springs n1~n3 are necessary for the sheet-delivering path to complete the single-face/double-face scanning operation. Also, the above Patents fail to disclose any measure for achieving both scanning and printing functions.

It is therefore tried by the applicant to provide an improved sheet-feeding apparatus which includes less components and has simplified structure. In addition, the improved sheet-feeding apparatus is capable of more easily single-face/double-face both scanning and printing sheets at higher sheet-delivering efficiency.

SUMMARY OF THE INVENTION

It is therefore a primary object of the present invention to provide a sheet-feeding apparatus having simplified sheet-feeding path for delivering sheets at higher efficiency.

According to the above object, the sheet-feeding apparatus of the present invention includes a sheet-feeding path in which a sheet can pass through an image-processing section which can be a scanning module and/or a printing module. The sheet-feeding path includes a first passage, a second passage communicating with the first passage and a subsidiary passage positioned between the first and second passages. The sheet is selectively delivered through the first passage, the second passage and/or the subsidiary passage to be single-face/double-face scanned/printed.

In the above sheet-feeding apparatus, the first passage has a front end section and a rear end section and the second passage also has a front end section and a rear end section. The rear end section of the first passage communicates with the front end section of the second passage. The subsidiary passage communicates with the front end section of the first passage and the rear end section of the second passage.

In the above sheet-feeding apparatus, when the guide member is switched to a first position, the guide member blocks the first passage. Under such circumstance, the sheet passes through the subsidiary passage toward the printing module or a sheet-releasing cartridge.

The present invention can be best understood through the following description and accompanying drawings wherein:

DETAILED DESCRIPTION OF THE PREFERRED EMBODIMENTS

Figure 1:
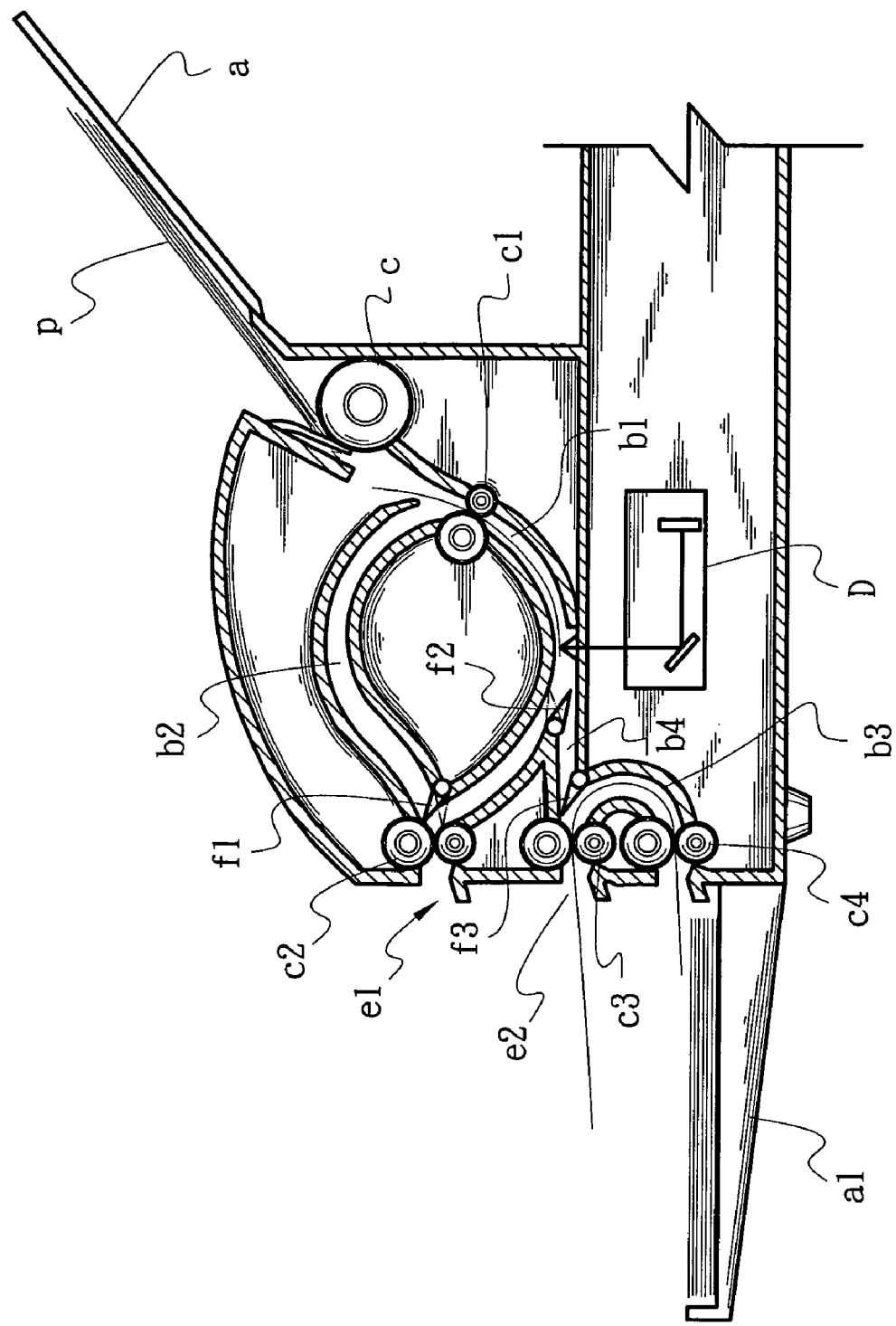
FIG. 1 is a side view of a conventional automatic sheet-feeding apparatus.
Figure 2:
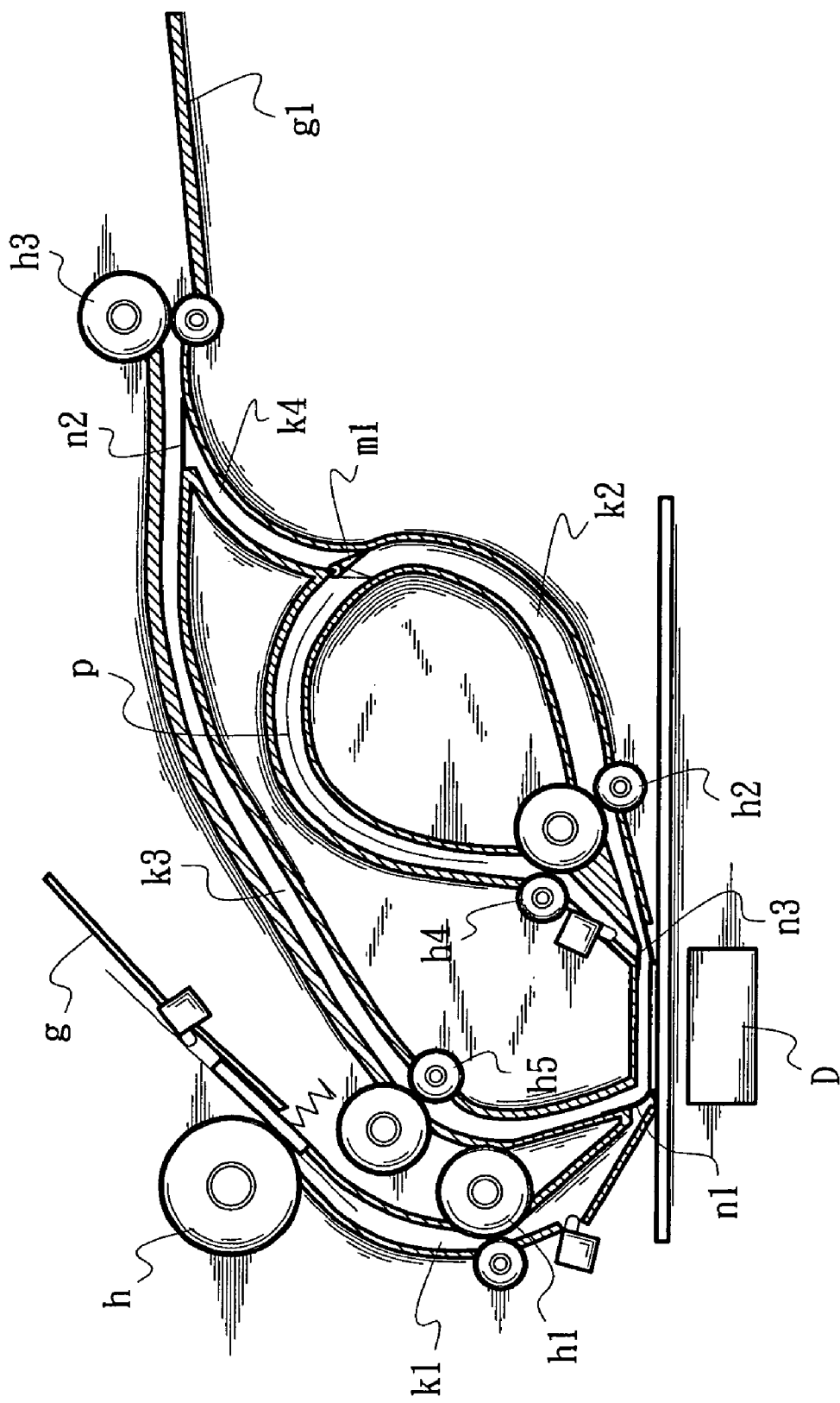
FIG. 2 is a side view of another conventional automatic paper-feeding apparatus.
Figure 3:
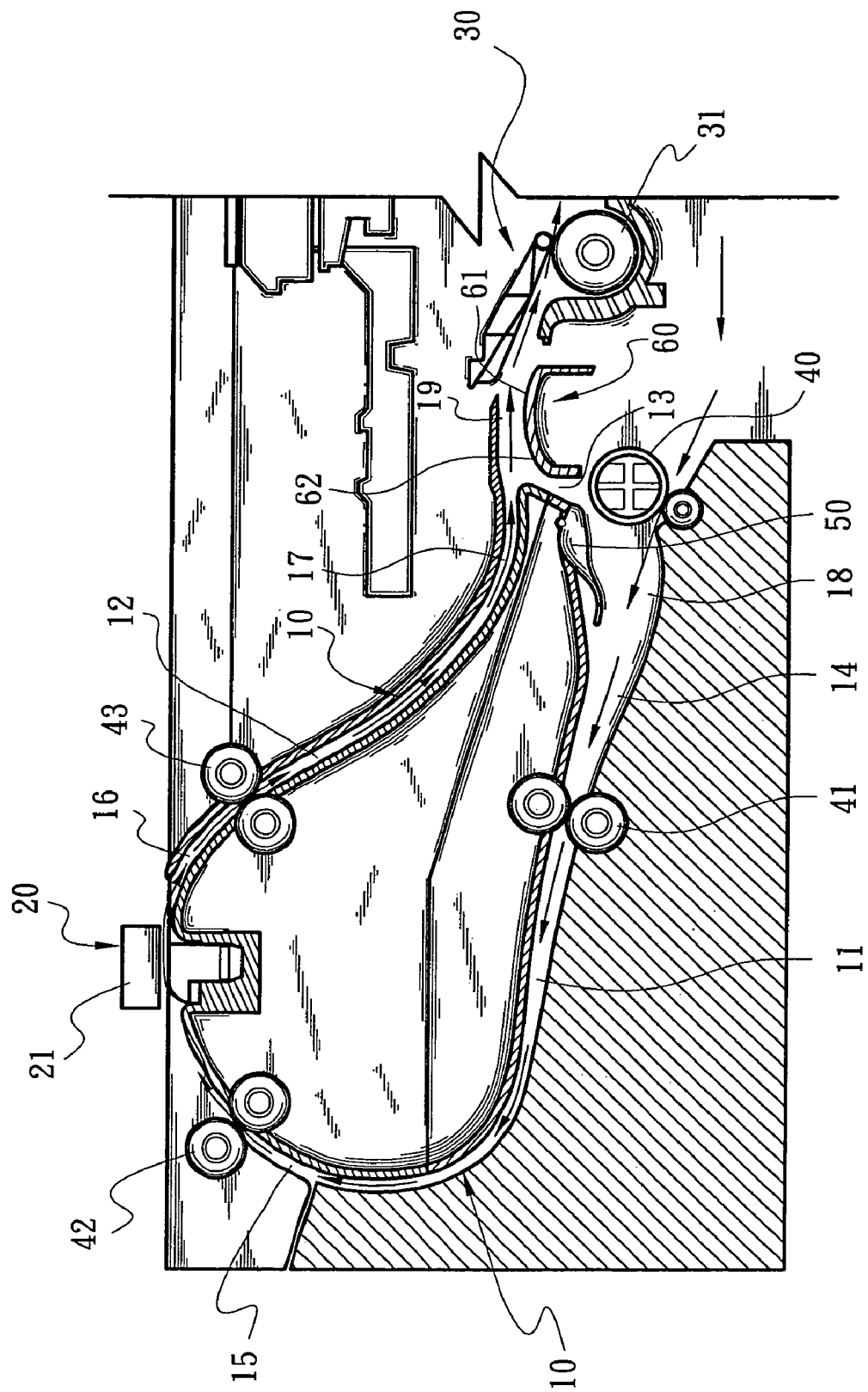
FIG. 3 is a side view of the sheet-feeding apparatus of the present invention, showing that a document is single-face scanned.
Figure 4:
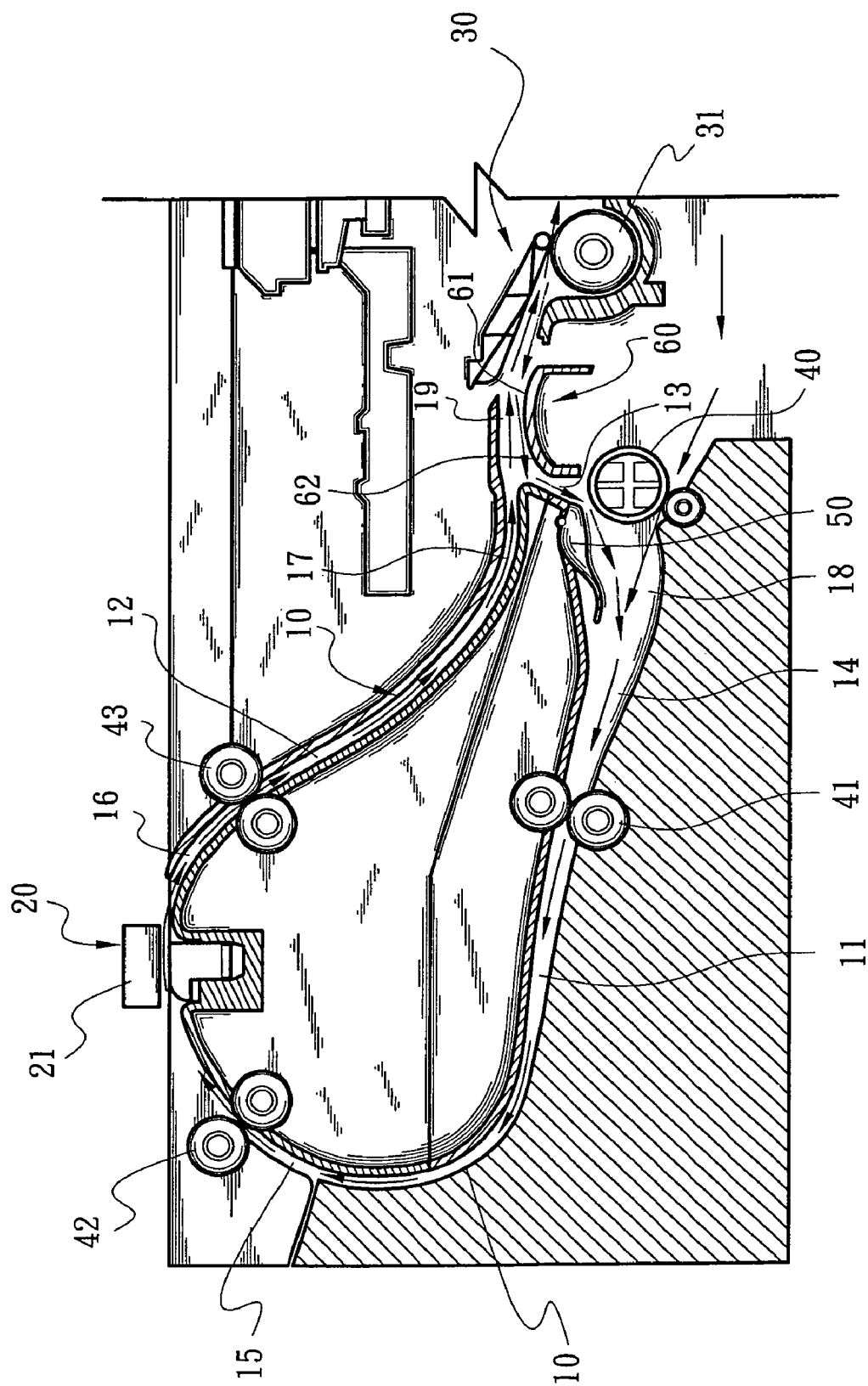
FIG. 4 is a side view of the sheet-feeding apparatus of the present invention, showing that a document is double-face scanned.

Please refer to FIGS. 3 and 4. The sheet-feeding apparatus of the present invention includes a sheet-feeding path 10 in which a paper can pass through an image-processing section. The image-processing section is a scanning module 20 with an image sensor 21 and/or a printing module 30. The sheet-feeding path 10 includes a sheet-feeding passage or a first passage 11, a sheet-releasing passage or a second passage 12 communicating with the first passage 11 and a subsidiary passage 13 positioned between the first and second passages 11, 12. In this embodiment, the first passage 11 has a front end section 14 and a rear end section 15. The second passage 12 has a front end section 16 and a rear end section 17. The rear end section 15 of the first passage 11 communicates with the front end section 16 of the second passage 12.

As shown in FIGS. 3 and 4, the subsidiary passage 13 communicates with the front end section 14 of the first passage 11 and the rear end section 17 of the second passage 12. A sheet-feeding roller 40 and a reciprocally swinging guide member 50 are arranged in an entrance 18 of the front end section 14 of the first passage 11. Multiple roller sets 41, 42, 43 are disposed in the sheet-feeding path 10.

In a preferred embodiment, the scanning module 20 is positioned between the rear end section 15 of the first passage and the front end section 16 of the second passage. It should be noted that the scanning module 20 can be alternatively positioned in the first passage 11 or the second passage 12. The scanning module 20 is replaceable with a printing module 30. In this embodiment, the printing module 30 is arranged in a position near an exit 19 of the rear end section 17 of the second passage as shown in FIGS. 3 and 4.

In a preferred embodiment, a platform 60 is arranged between the exit 19 of the second passage and the printing module 30. The platform 60 has a plane face or a curved face 61 for helping in more smoothly delivering the sheet. Basically, the plane face or curved face 61 is located in a position lower than the rear end section 17 of the second passage 12.

In FIG. 3, the arrows indicate the delivering path of the document to be single-face scanned. The guide member 50 is positioned on an upper side of the first passage 11 to unblock the first passage 11. The document is driven by the sheet-feeding roller 40 to go into the first passage 11. After going through the rear end section 15 of the first passage and the roller set 42, the document is scanned by the scanning module 20. Then the document gets into the second passage 12 to be released from the exit 19 thereof. At this time, a first face of the document is scanned. It should be noted that in the case that the printing module 30 is set in an off state, the document can pass through the printing module 30 as shown in FIG. 3.

In FIG. 4, the phantom arrows indicate the delivering path of the document to be double-face scanned. After the document is single-face scanned as shown in FIG. 3, the document can be driven by a sheet-releasing roller 31 in a reverse direction (leftward according to FIG. 4) into the subsidiary passage 13. Then the document goes into the first passage 11. After going through the rear end section 15 of the first passage and the roller set 42, the document is scanned by the scanning module 20. Then the document gets into the second passage 12 to be released from the exit 19 thereof. At this time, a second face of the document is scanned.

As shown in FIG. 4, the platform 60 has a slope 62 near the rear end section 17 of the second passage. The slope 62 is apparently lower than the rear end section 17 of the second passage 12, whereby the document can be more smoothly driven into the subsidiary passage 13.

Figure 5:
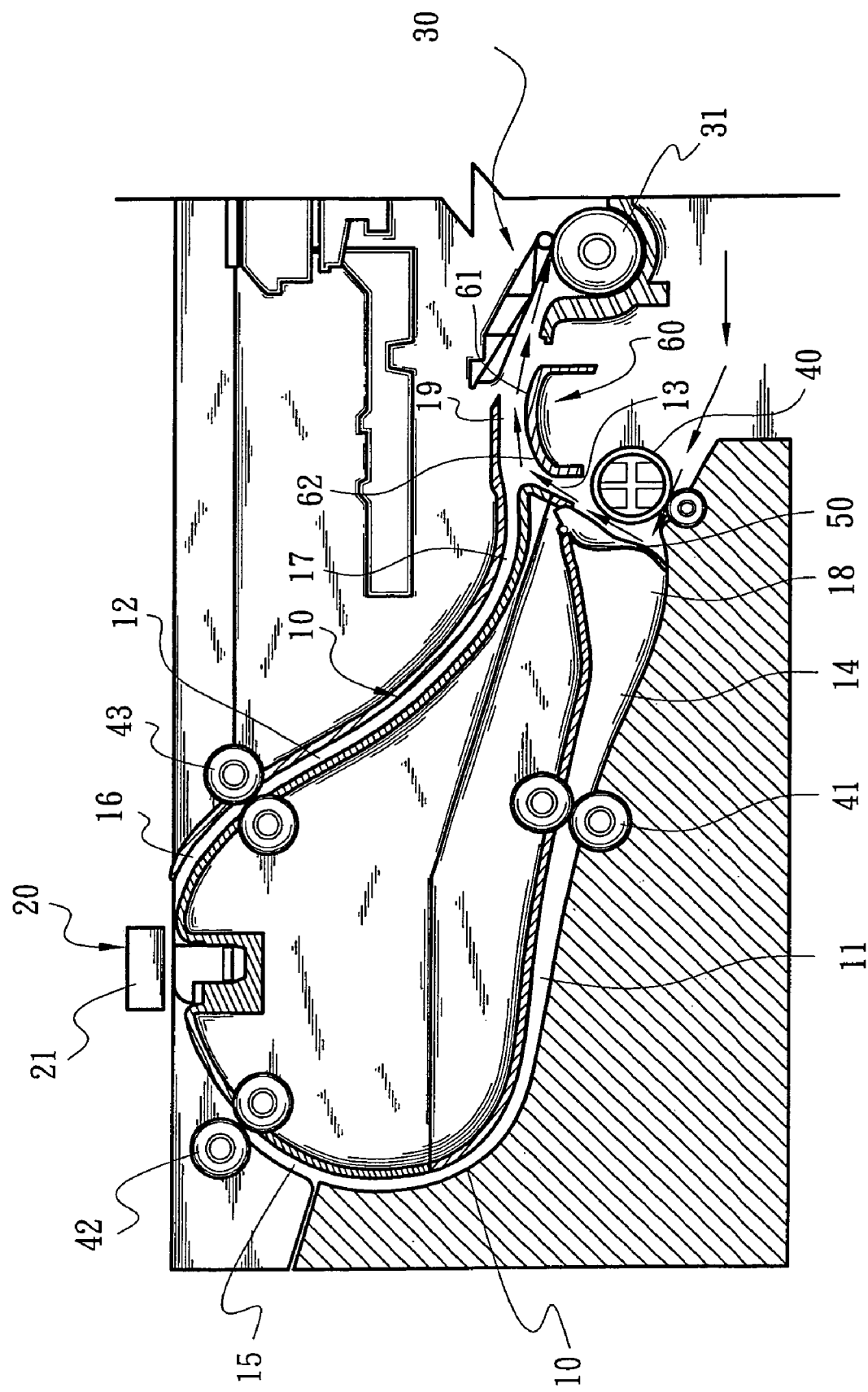
FIG. 5 is a side view of the sheet-feeding apparatus of the present invention, showing that a sheet is single-face printed.

In FIG. 5, the arrows indicate the delivering path of the sheet to be single-face printed. The guide member 50 swings to lower side of the first passage 11 to block the first passage 11. The sheet is driven by the sheet-feeding roller 40 to go into the subsidiary passage 13. Then the sheet goes through the exit 19 to pass through the printing module 30 and printed by the printing module 30. At this time, a first face of the sheet is printed.

Figure 6:
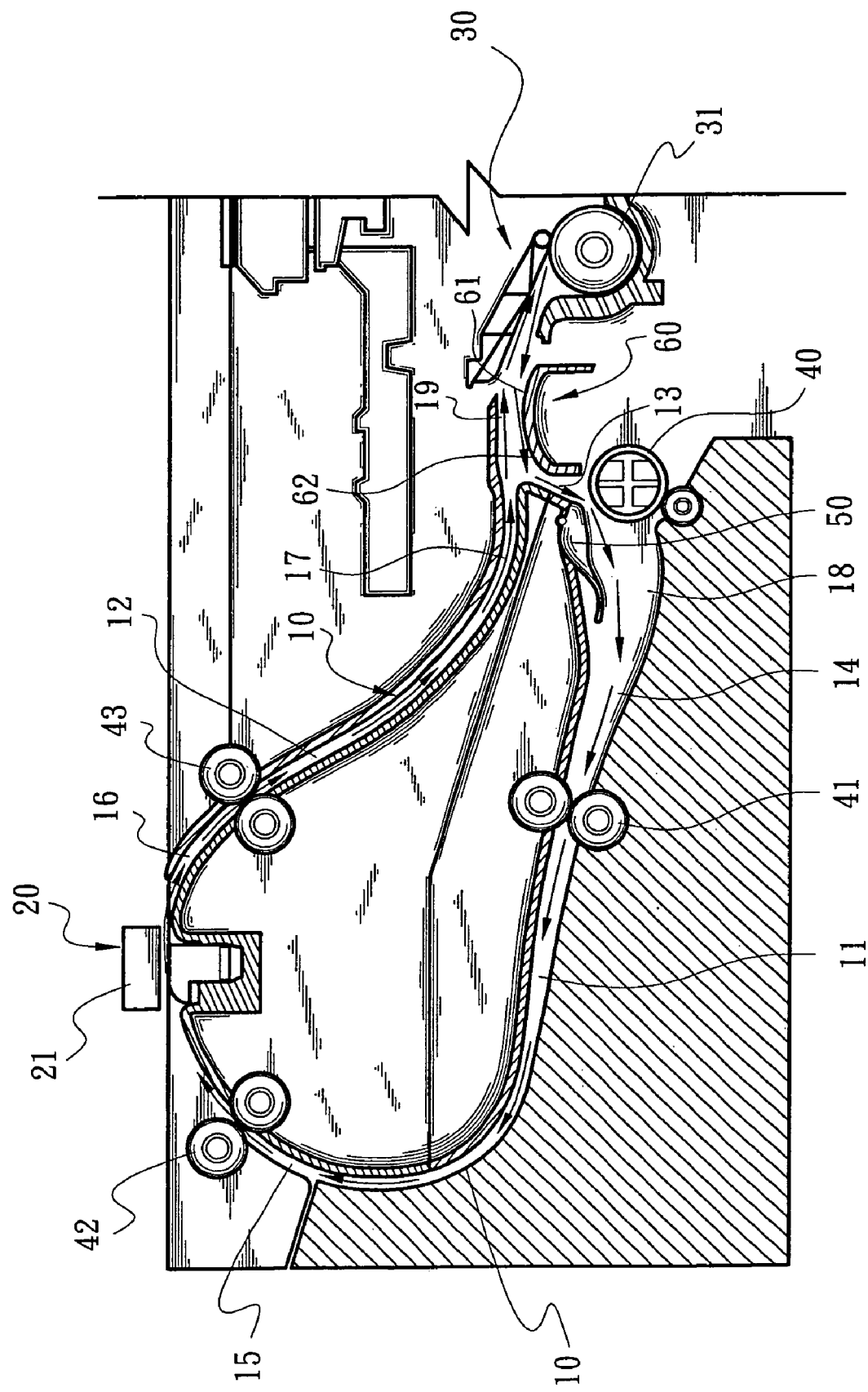
FIG. 6 is a side view of the sheet-feeding apparatus of the present invention, showing that a sheet is double-face printed.

In FIG. 6, the arrows indicate the delivering path of the sheet to be double-face printed. After the sheet is single-face printed as shown in FIG. 5, the sheet is driven by the sheet-releasing roller 31 in a reverse direction (leftward according to FIG. 6) into the subsidiary passage 13. At this time, the guide member 50 swings back to upper side of the first passage 11 to unblock the first passage 11. After going through the rear end section 15 of the first passage and the roller set 42, the sheet passes through the scanning module 20 set in an off state. Then the sheet goes into the second passage 12 to be released from the exit 19 thereof. Then a second face of the sheet is printed by the printing module 30. At this time, the sheet is double-face printed.

According to the above arrangement, the present invention has the following advantages:

1. In contrast to prior art, the sheet-feeding apparatus of the present invention has a simplified sheet-delivering path capable of more easily single-face/double-face both scanning and printing sheets at higher sheet-delivering efficiency.
2. When scanning/printing a first face and a second face of a sheet, a common sheet-delivering path is used. Therefore, the complicated third passage b3 or the sheet-returning passage k2 of the conventional automatic sheet-feeding apparatus is no more necessary.
3. The sheet-feeding apparatus of the present invention includes less components (such as roller set, guide member, etc.) and has simplified structure.

The above embodiments are only used to illustrate the present invention, not intended to limit the scope thereof. Many modifications of the above embodiments can be made without departing from the spirit of the present invention.

What is claimed is:

1. A sheet-feeding apparatus comprising a sheet-feeding path in which a sheet can pass through an image-processing section, the sheet-feeding path including a first passage, a second passage communicating with the first passage and a subsidiary passage positioned between the first and second passages, the sheet being selectively delivered through the first passage, the second passage and/or the subsidiary passage, wherein the image-processing section is a printing module, and a platform is arranged in the sheet-feeding path and has a plane face or a curved face.

2. The sheet-feeding apparatus as claimed in claim 1, wherein the image-processing section is a scanning module with an image sensor.

3. The sheet-feeding apparatus as claimed in claim 1, wherein the first passage has a front end section and a rear end section and the second passage also has a front end section and a rear end section, the rear end section of the first passage communicating with the front end section of the second passage.

4. The sheet-feeding apparatus as claimed in claim 3, wherein the subsidiary passage communicates with the front end section of the first passage and the rear end section of the second passage.

5. The sheet-feeding apparatus as claimed in claim 3, wherein the rear end section of the second passage has an exit.

6. The sheet-feeding apparatus as claimed in claim 1, wherein multiple roller sets are disposed in the sheet-feeding path.

7. The sheet-feeding apparatus as claimed in claim 1, wherein the image-processing section is positioned between the first passage and the second passage.

8. The sheet-feeding apparatus as claimed in claim 1, wherein the platform is positioned between the second passage and the image-processing section.

9. The sheet-feeding apparatus as claimed in claim 1, wherein the platform has a slope near the second passage, the slope being lower than the second passage.

10. A sheet-feeding apparatus comprising a sheet-feeding path in which a sheet can pass through an image-processing section, the sheet-feeding path including a first passage, a second passage communicating with the first passage and a subsidiary passage positioned between the first and second passages, the sheet being selectively delivered through the first passage, the second passage and/or the subsidiary passage, wherein the first passage has a front end section and a rear end section and the second passage also has a front end section and a rear end section, the rear end section of the first passage communicating with the front end section of the second passage, and wherein the front end section of the first passage has an entrance, a sheet-feeding roller and a reciprocally swinging guide member being arranged in the entrance.

11. A sheet-feeding apparatus comprising a sheet-feeding path in which a sheet can pass through an image-processing section, the sheet-feeding path including a first passage, a second passage communicating with the first passage and a subsidiary passage positioned between the first and second passages, the sheet being selectively delivered through the first passage, the second passage and/or the subsidiary passage, wherein the image-processing section is a printing module, wherein the first passage has a front end section and a rear end section and the second passage also has a front end section and a rear end section, the rear end section of the first passage communicating with the front end section of the second passage, the rear end section of the second passage has an exit, the image-processing section is positioned near the exit of the second passage.

12. A sheet-feeding apparatus comprising a sheet-feeding path in which a sheet can pass through an image-processing section, the sheet-feeding path including a first passage, a second passage communicating with the first passage and a subsidiary passage positioned between the first and second passages, the sheet being selectively delivered through the first passage, the second passage and/or the subsidiary passage, wherein the first passage has a front end section and a rear end section and the second passage also has a front end section and a rear end section, the rear end section of the first passage communicating with the front end section of the second passage, the rear end section of the second passage having an exit, a sheet-releasing roller and a printing module being arranged at the exit of the second passage.

\* \* \* \* \*